(12) United States Patent
Prokhorov (10) Patent No.: US 9,592,719 B2
(45) Date of Patent: Mar. 14, 2017

(54) ANTI-BLINDING DEVICE FOR AN AUTOMOTIVE VEHICLE

(71) Applicant: TOYOTA MOTOR ENGINEERING & MANUFACTURING NORTH AMERICA, INC. (TEMA), Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 522 days.

(21) Appl. No.: 13/661,365

(22) Filed: Oct. 26, 2012

(65) Prior Publication Data

US 2014/0118833 A1     May 1, 2014

(51) Int. Cl.
*B60J 3/02*     (2006.01)
*G02B 5/20*     (2006.01)
*G02B 7/00*     (2006.01)

(52) U.S. Cl.
CPC ........... *B60J 3/0278* (2013.01); *B60J 3/0208* (2013.01); *G02B 5/20* (2013.01); *G02B 7/006* (2013.01)

(58) Field of Classification Search
CPC ...... B60J 3/0204; B60J 3/0208; B60J 3/0213; B60J 3/0226; B60J 3/0273; B60J 3/0278; B60J 3/0494; B60J 10/0062; B60J 10/0071; B60J 10/02; B60J 10/12; B60J 10/04; G02B 2027/014; G02B 2027/0178; G02B 2027/0187; G02B 23/18; G02B 27/017; G02B 27/281; G02B 5/00; G02B 5/20; G02B 5/22; G02B 5/26; G02B 7/00; G02B 7/003; G02B 7/004; G02B 7/005; G02B 7/006
See application file for complete search history.

(56) References Cited

U.S. PATENT DOCUMENTS

| | | | | |
|---|---|---|---|---|
| 1,765,566 A | * | 6/1930 | Howard et al. | 296/95.1 |
| 2,894,576 A | * | 7/1959 | Williams | 160/220 |
| 3,415,569 A | | 12/1968 | Leevo | |
| 3,499,679 A | | 3/1970 | Olander | |
| 4,483,590 A | * | 11/1984 | Moss | 359/235 |
| 4,792,176 A | * | 12/1988 | Karford | B60J 3/0208 296/97.6 |
| 4,858,989 A | | 8/1989 | Bruckstein | |
| 4,989,910 A | | 2/1991 | Mersman et al. | |
| 5,015,027 A | | 5/1991 | Rifaat | |
| 5,271,653 A | | 12/1993 | Shirley | |
| 5,283,683 A | * | 2/1994 | Yamamoto | B60J 3/0208 296/97.8 |
| 5,472,255 A | * | 12/1995 | Moore | B60J 3/0208 296/97.6 |

(Continued)

FOREIGN PATENT DOCUMENTS

| | | |
|---|---|---|
| CA | 2135097 | 5/1996 |
| DE | 3151315 | 7/1983 |

(Continued)

*Primary Examiner* — Thong Nguyen
(74) *Attorney, Agent, or Firm* — Oblon, McClelland, Maier & Neustadt, L.L.P.

(57) ABSTRACT

A light filter assembly for an automotive vehicle that includes a central plate or a sleeve with at least one filter attached to by a fastener. The filter has a substantially triangular shape with at least one curved edge, and can rotate about the fastener in a plane parallel to the central plate or sleeve.

14 Claims, 12 Drawing Sheets

(56) References Cited

U.S. PATENT DOCUMENTS

| | | | |
|---|---|---|---|
| D367,029 S * | 2/1996 | Spaulding | D12/191 |
| 5,513,892 A * | 5/1996 | Thomas | B60J 3/0208 |
| | | | 296/97.2 |
| 5,683,134 A * | 11/1997 | Espinosa | B60J 3/0208 |
| | | | 296/97.8 |
| 5,855,405 A * | 1/1999 | Robles | 296/97.4 |
| 6,189,947 B1 * | 2/2001 | Annan | B60J 3/0208 |
| | | | 296/97.11 |
| 6,402,221 B1 | 6/2002 | Ogunjobi | |
| 6,406,086 B2 * | 6/2002 | Bauer | B60J 3/0208 |
| | | | 296/97.1 |
| 6,981,733 B1 | 1/2006 | Driscoll | |
| 7,011,354 B1 * | 3/2006 | Gullickson | 296/97.11 |
| 2011/0001332 A1 | 1/2011 | Weber | |

FOREIGN PATENT DOCUMENTS

| | | |
|---|---|---|
| FR | 2755404 | 5/1998 |
| GB | 2321629 | 8/1998 |

\* cited by examiner

ANTI-BLINDING DEVICE FOR AN AUTOMOTIVE VEHICLE

BACKGROUND

Individuals driving automobiles can experience glared vision as a result of light emitted from the headlights of automobiles traveling in oncoming lanes of traffic, which can create potentially hazardous conditions that reduce an individual's ability to safely operate an automobile. In particular, an individual may be distracted by the glare, thereby causing the individual's focus to be directed to the source of the glare, and diverting the individual's eyes from the road on which the individual is traveling. Further, an individual may experience a residual reduction in clarity of the individual's vision of other objects, such as the road and objects on the road.

SUMMARY

Aspects of this disclosure relate to an anti-blinding assembly for an automobile.

An anti-blinding assembly can include at least one filter with a substantially triangular shape and one curved edge. The filter can be rotatably attached to a central plate or a sleeve by one fastener attached to the central plate or sleeve.

An anti-blinding assembly can include a filter that can include a first end of a first straight edge connected to a first end of a third straight edge, a first end of a second straight edge connected to a first end of a curved edge, a second end of the curved edge connected to a second end of the third straight edge, and a second end of the first straight edge connected to a second end of the second straight edge. In some aspects the filter can be attached to a back side of a central plate or a sleeve. Further in some aspects, the filter can include a first protrusion extending from the first end of the first straight edge, and a second protrusion extending from the first end of the second straight edge.

An anti-blinding assembly can include a track formed on a surface of a central plate, and a fastener can be provided in the track. The track can extend from a first corner of the central plate to a second corner of the central plate along a first edge of the central plate. The fastener and the filter can slide along the first edge in the track between the first corner and the second corner. In some aspects, the track can extend along a second edge of the central plate towards a middle portion of the central plate, from one of the first corner and the second corner. The fastener and the filter can slide along the second edge. Further in some aspects, an anti-blinding assembly can include a second filter attached to the central plate by a second fastener in a second track. The second track can extend along the second edge from a third corner toward the middle portion of the central plate. The second track can extend from the third corner to a fourth corner of the central plate, along a third edge of the central plate. The second fastener and the second filter can slide in the second track along the second or third edge.

An anti-blinding device can include a central plate disposed in a sleeve. The sleeve can include a back portion, a front portion, and a middle section. The back portion can define a top edge and a bottom edge of the sleeve. The front portion can include a first side section and a second side section that extend from the top edge to the bottom edge in a vertical direction of the sleeve. The middle section can extend from the first side section to the second side section in a horizontal direction and can define a lip. The lip can provide a portion of an inner surface of the back portion that is not covered by the front portion of the sleeve. The central plate can be provided so as to be able to move vertically relative to the sleeve. The central plate can be completely inserted in the sleeve, and a lower portion of the central plate can extend below the lip of the sleeve when the central plate is completely inserted in the sleeve. A first filter and second filter can be attached to the central plate. The first filter, the second filter, the back portion, and the front portion of the sleeve can be semi-transparent. The sleeve can include a first track between the back portion and the first side section. The first track can receive a first side edge and a first stop tab of the central plate. The sleeve can include a second track between the back portion and the second side section. The second track can receive a second side edge and a second stop tab of the central plate. The central plate can slide within first track and the second track in the vertical direction.

An anti-blinding assembly can include a central plate and a plurality of light filters that can be disposed between a front portion and a back portion of a sleeve. Each light filters can be provided with a protrusion and can move in the vertical direction relative to the sleeve. The central plate can be disposed between the plurality of light filters and an inner surface of the back portion of the sleeve. A first set of tracks can be provided between a back portion and a first side section of the sleeve. The first set of tracks can receive a first stop tab of a central plate and a first stop tab of each of the plurality of light filters. A second set of tracks can be provided between the back portion and a second side section of the sleeve. The second set of tracks can receive a second stop tab of the central plate and a second stop stab of each of the plurality of light filters. The central plate and each of the light filters may slide in the vertical direction relative to the sleeve.

An anti-blinding device can include a connection rod defining an axis of rotation, and a central plate and a plurality of light filter panels can be attached to the connection rod. A front surface of a first filter and a front surface of a second filter can face a backside of the central plate, and a back surface of a first one of the plurality of light filter panels can face a front surface of the central plate. The central plate and the plurality of light filters can attach to the connection rod and rotate from an up position to a down position about the axis of rotation. The central plate can be provided so as to rotate from the up position to the down position before the plurality of light filters can be rotated into the down position. A first track can be formed on a surface of the backside of the central plate. The first track can extend from a first corner of the central plate to a second corner of the central plate along a first edge of the central plate. The first track can extend from the second corner toward a middle portion of the central plate along a second edge of the central plate. A second track can be formed on the surface of the backside of the central plate. The second track can extend from a third corner of the central plate to a fourth corner of the central plate along a third edge of the central plate. The second track can extend from the third corner to the middle portion along the second edge. The first fastener can be provided in the first track and can slide in the first track. The first fastener and the first filter can slide along the first edge and the second edge when the first fastener slides in the first track. The second fastener can be provided in the second track and can slide in the second track. The second fastener and the second filter can slide along the second edge and the third edge when the second fastener slides in the second track.

An anti-blinding assembly can include one fastener, and two or more filters with a substantially triangular shape having a curved edge. The one fastener can attach the two or more filters to a surface of a central plate or a sleeve. The two or more filters can be arranged adjacently on the one fastener.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of aspects of this disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout the several views. An anti-blinding assembly may include a central plate with triangular-shaped filters rotatably attached in tracks on a surface of the central plate. The triangular-shaped filters may be semi-transparent, and able to rotate into a position that blocks or filters glare from headlights that a driver may be subject to while driving at night. The triangular-shaped filters help filter the peripheral vision of the driver when deployed. In some aspects, the triangular-shaped filters can move laterally and be adjusted in accordance with the curvature of the road over the viewable horizon. The anti-blinding device can be attached to the roof of the vehicle using a bracket, and located in front of a windshield. Various implementations of the anti-blinding assembly may include a plurality of light filtering panels that can be deployed to increase the blockage of light depending on a driver's preference.

Figure 1A:
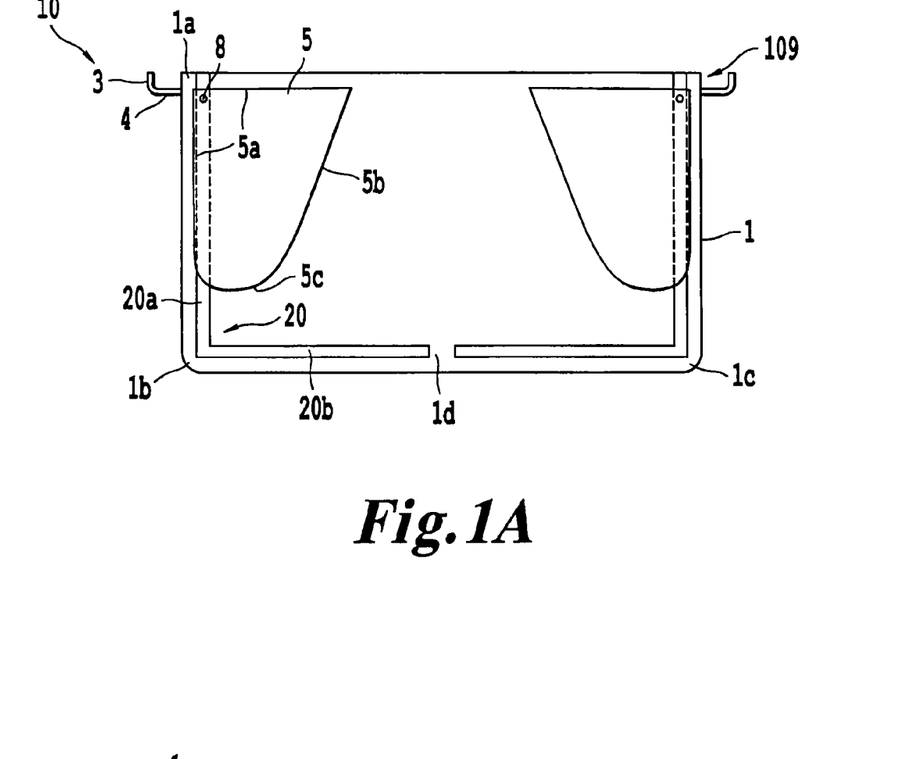
FIGS. 1A-1C illustrate an anti-blinding device including a track for holding triangular shaped filters.
Figure 1B:
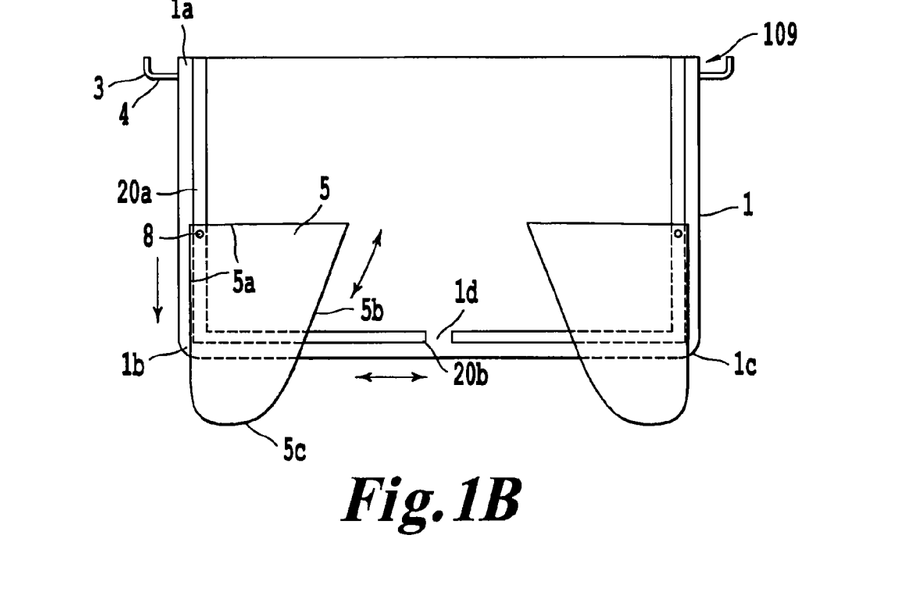
Figure 1C:
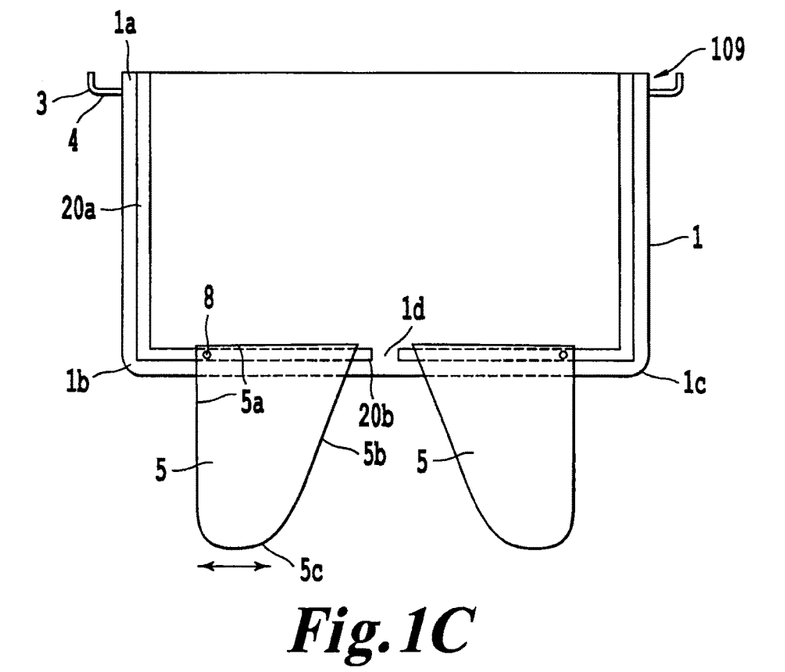

FIGS. 1A-1C illustrate an assembly for an anti-blinding device. The anti-blinding device 10 includes a central plate 1 attached to the roof of a vehicle (not shown) by a bracket 3, and a rod 4 which extends through a top portion 9 of the central plate 1. Two triangular-shaped filters 5 are attached to the central plate 1, in plate tracks 20, by fasteners 8. The triangular-shaped filters 5 move with the fasteners 8 that move within the plate tracks 20. Although two triangular-shaped filters 5 are provided, only one triangular-shaped filter 5 may be provided in the plate track 20 that is closest to oncoming traffic (i.e. depending on what side of the road a particular vehicle is normally driven on).

Each triangular-shaped filter 5 includes two straight edges 5a connected at a right angle to each other, a third straight edge 5b, and a curved edge 5c extending from the third straight edge 5b. The third straight edge 5b extends from a distal end of one straight edge 5a and is transitioned to the curved edge 5c that extends to a distal end of the other straight edge 5a, as illustrated in FIGS. 1A-1C. The third straight edge 5b is provided at an angle with respect to one of the two straight edges 5a it is connected with. The third straight edge 5b is straight so as to coincide with an edge of a road (or lane) seen in the distance of a viewable horizon. The curved edge 5c provides a wide rounded surface area for a driver to grip and rotate the triangular-shaped filter 5 to a desired angle.

The fasteners 8 attach the triangular-shaped filters 5 to the central plate 1. The fasteners 8 are located, and slide, within the plate tracks 20. The plate tracks 20 are formed on the surface of the central plate 1 facing a driver, and allow four way directional movement of the fasteners 8 and triangular-shaped filter 5. The plate track 20 on the left hand side of the central plate 1, for example, includes a first section 20a that extends vertically from a first corner 1a to a second corner 1b of the central plate 1. A second section 20b of the plate track 20 extends laterally from the second corner 1b towards a third corner 1c, and ends in a middle section 1d of the central plate 1. The triangular-shaped filters 5 can move up and down when the fastener 8 is moved within the first section 20a, and laterally when the fastener 8 is moved within the second section 20b of the plate tracks 20.

The triangular-shaped filters 5 may be semi-transparent to shade the light of headlights of oncoming traffic, and reduce any glare that may be created by the headlights. The plate tracks 20 allow the triangular-shaped filters 5 to be located in, among other locations, second and third the corners (1b, 1c) of the central plate 1. In these locations, the triangular-shaped filters 5 reduce the amount of glare created by the headlights of oncoming traffic at night, which may be caught within a driver's peripheral vision as another automobile traveling in the opposite direction passes by.

FIG. 1A illustrates the anti-blinding device 10 with triangular-shaped filters 5 located in a retracted position. FIG. 1B illustrates the anti-blinding device 10 with the triangular-shaped filters 5 partially deployed in a vertical direction, such that only a portion of the triangular-shaped filters 5 extend below a lower edge of the central plate 1. The curved edges 5c of the triangular-shaped filters 5 provide wide rounded surfaces that are easy for a driver to grip and pull in order to move the triangular-shaped filters 5 into desired vertical positions. Depending on the curvature of the road, the number of lanes of on-coming traffic, or other driving conditions experienced during the day or at night, the driver has the ability to position the triangular-shaped filters 5 vertically in multiple locations along the first portions 20a of the plate tracks 20.

FIG. 1C illustrates the triangular-shaped filters 5 in full vertical deployment. The triangular shaped filters 5 have also been partially moved inwards by sliding respective fastener 8 within second portions 20b of the plate tracks 20, in a lateral direction. The second portions 20b allow a driver to narrow the portion of the driver's view that is not filtered so that the third straight edges 5b can be coincident with an inner edge of the road (or lane) that oncoming traffic is traveling on. In addition, the triangular-shaped filters 5 can be rotated so the third straight edge 5b is coincident with an edge of the road (or lane). Thus, a driver can constantly move the triangular-shaped filters 5 to filter the light from oncoming headlights that comes within the driver's view over an oncoming horizon. Concurrently, a driver's view over the oncoming horizon, of the road being traveled on, can be isolated and not subject to the filtering effect provided by the triangular-shaped filters 5. Therefore, the triangular-shaped filters 5 can be used by an individual to filter the light from the headlights of oncoming traffic, and reduce the glare created within the individual's field of vision.

A driver may repeatedly change the lateral and vertical position of the triangular-shaped filters 5 so that a desired portion of the driver's view is filtered. The triangular-shaped filters 5 can be advantageous, because determining and moving the triangular-shaped filters 5 into desired positions engages the driver's attention during periods where the driver may be susceptible to falling asleep, such as while driving at night. Determining and moving the triangular-shaped filters 5 into desired positions can provide a mental and physical stimulus that causes the driver to be more alert and awake when driving, especially at night.

In addition to the arrangement illustrated, the anti-blinding device 10 can be provided as a unit which can be attached to a visor of an automobile, and removed if so desired. In such an arrangement the anti-blinding device 10 can be attached to the side of a visor that faces a driver when deployed. The anti-blinding device 10 can be attached by way of clips, clamps, Velcro, or other known attachment mechanisms.

Figure 2A:
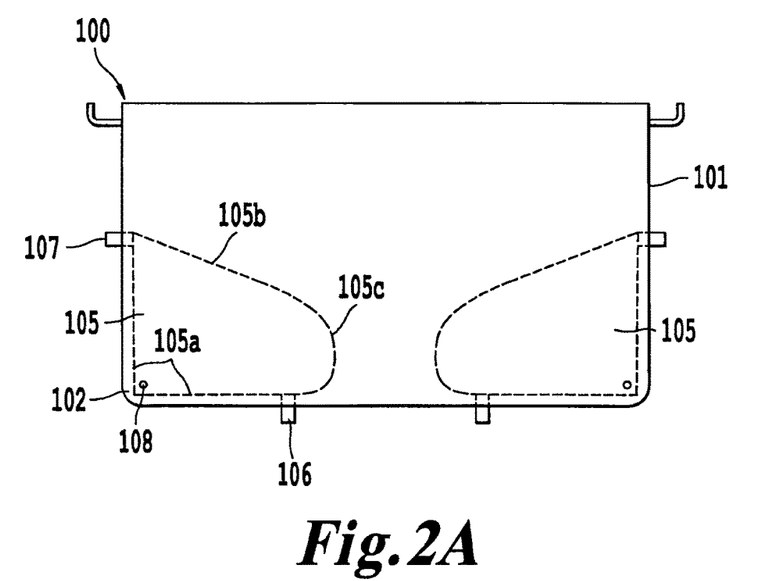
FIGS. 2A-2C illustrate an anti-blinding device including fasteners located at corners.
Figure 2B:
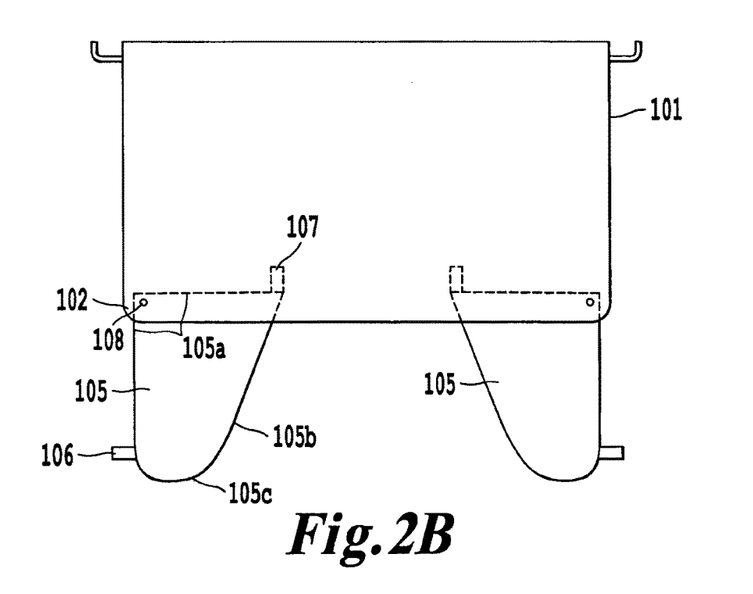
Figure 2C:
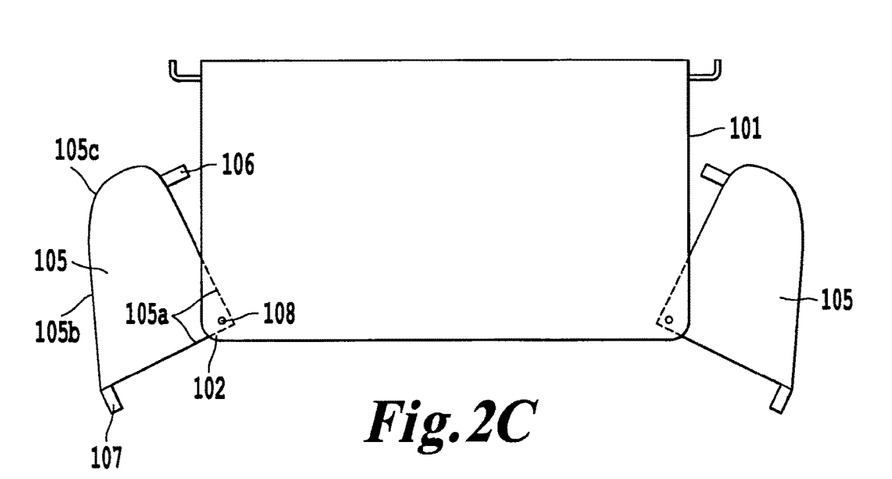

FIGS. 2A-2C illustrate an anti-blinding device 100 including triangular-shaped filters 105 attached to a central plate 101 by fasteners 108 fixed to corners 102 of the central plate 101. The triangular-shaped filters 105 are attached by the fasteners 108 to a side of the central plate 101 opposite to a side facing a driver.

Each triangular-shaped filter 105 includes two straight edges 105a connected at a right angle to each other, a third straight edge 105b, and a curved edge 105c extending from the third straight edge 105b. A first tab 106 extends at a right angle from an end of the one of the two straight edges 105a connected to the curved edge 105c. With triangular-shaped plates 105 in positions illustrated in FIG. 2A, a driver will not have access to the triangular-shaped plates 105, except for respective first tabs 106 and second tabs 107. A second tab 107 extends from an end of the other straight edge 105a that is connected to the third straight edge 105b. The first tab 106 or the second tab 107, can be used to rotate the triangular-shaped filter 105 into a desired position from behind the central plate 101.

In FIG. 2B, the anti-blinding device 100 is illustrated with the triangular-shaped filters 105 deployed in a downward position. The triangular-shaped filters 105 can be quickly moved into this position when a driver pulls the first tab 106 downward. In FIG. 2C the anti-blinding device 100 is illustrated with triangular-shaped filters 105 deployed in an outward position. The triangular-shaped filters 105 can be quickly moved into this position when a driver pulls the second tab 107 away from a vertical edge of the central plate 101.

In addition to the arrangement illustrated, the anti-blinding device 100 can be provided as a unit which can be attached to a visor of an automobile and removed if so desired. In such an arrangement, the anti-blinding device 100 can be attached to the side of a visor that is opposite to a side that faces a driver when deployed. The anti-blinding device 100 can be attached by way of clips, clamps, Velcro, or other known attachment mechanisms.

Figure 3:
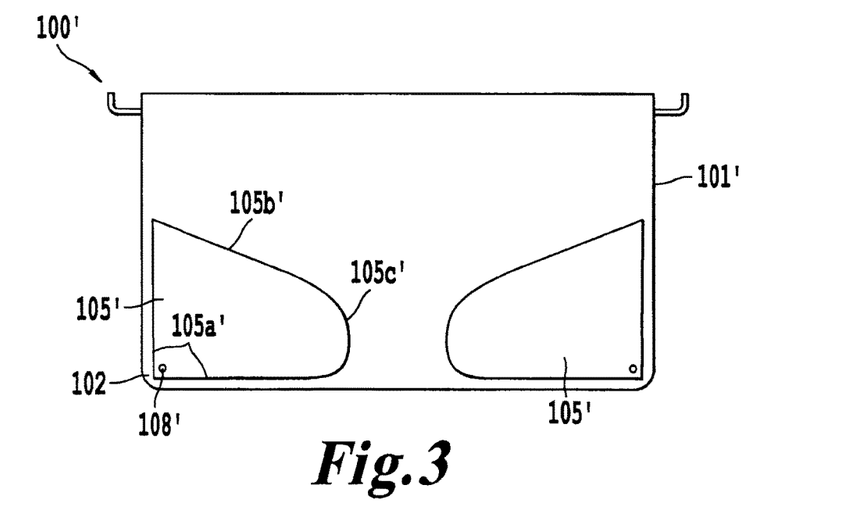
FIG. 3 another anti-blinding device including fasteners located at corners.

FIG. 3 illustrates an anti-blinding device 100' including triangular-shaped filters 105' attached to a central plate 101' by fasteners 108' fixed to corners 102' of the central plate 101'. The triangular-shaped filters 105' are attached by the fasteners 108', to a side of the central plate 101' facing a driver. A driver will have access to the triangular-shaped plates 105' when the central plate 101''s is rotated downward. The triangular-shaped filters 105' include two straight edges 105a', a third straight edge 105b', and a curved edge 105c'. The driver will be able to put the triangular-shaped plates 105' in a desired position by gripping respective curved edges 105c', and rotating the triangular-shaped plates 105'.

In addition to the arrangement illustrated, the anti-blinding device 100' can be provided as a unit which can be attached to a visor of an automobile and removed if so desired. In such an arrangement, the anti-blinding device 100' can be attached to the side of a visor that faces a driver when deployed. The anti-blinding device 100' can be attached by way of clips, clamps, Velcro, or other known attachment mechanisms.

Figure 4A:
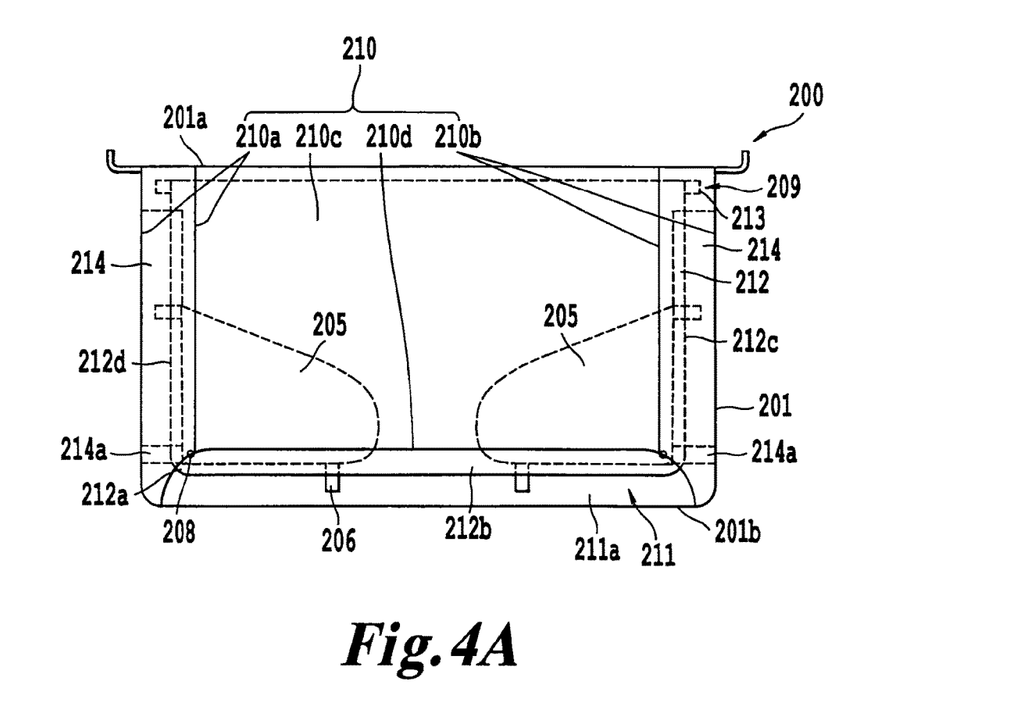
FIGS. 4A and 4B illustrate an anti-blinding device inside of a central sleeve.
Figure 4B:
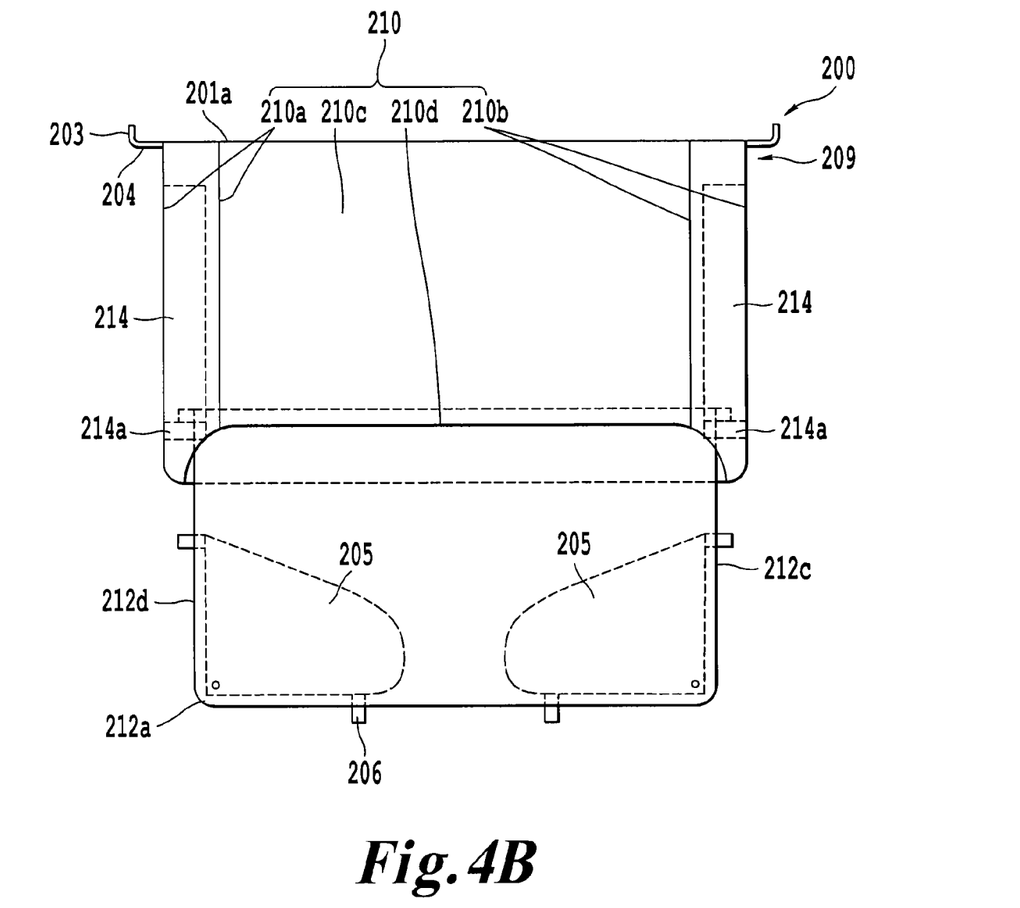

FIGS. 4A-4B illustrate an anti-blinding device 200 including a central sleeve 201 with a front portion 210 and a back portion 211, and a bracket 203 and a rod 204 for attachment to the roof of the vehicle. The front portion 210 includes a first side edge 210a, a second side edge 210b, and a middle section 210c which extends between the first and second side edges (210a, 210b). The first and second side edges (210a, 210b) extend vertically from a top edge 201a to a bottom edge 201b of the central sleeve 201. The middle section 210c extends from the top edge 201a of the central sleeve 201 to a location above the bottom edge 201b and forms a lip 210d. The back portion 211 extends from the top edge 201a to the bottom edge 201b of the central sleeve 201. The back portion 211 includes an inner back surface 211a, a portion of which is exposed by the lip 210d of the front portion 210.

A central plate insert 212 is disposed within the central sleeve 201. The central sleeve 201 and the central plate insert 212 may be formed by one or more semi-transparent materials that filter light. When the central plate insert 212 is completely inserted within the central sleeve 201, the combination of the front portion 210, the central plate insert 212, and the back portion 211 may substantially block light in the same manner as a conventional visor. The central plate insert 212 includes corners 212a, a bottom portion 212b, a first insert plate side edge 212c, and a second insert plate side edge 212d. In the corners 212a of the central plate insert 212, triangular-shaped filters 205 are attached by fasteners 208 to a side of the central plate insert 212 that faces the inner back surface 211a. The triangular-shaped filters 205 can include the same elements as the triangular-shaped filters 105 of FIGS. 2A and 2B, and can function in the same way when the central plate insert 212 is moved downward such that no portion of the triangular-shaped filters 205 is within the central sleeve 201.

The central plate insert 212 slides within central sleeve 201 and includes stop tabs 213. The stop tabs 213 extend from the first insert plate side edge 212c, and second insert plate side edge 212d, at a top portion 209 of the central plate insert 212. A single slot 214 is provided within the central sleeve 201 between the first side edge 210a and the back surface 211a. Another single slot 214 is provided within the central sleeve 201 between the second side edge 210b and the back surface 211a. Each single slot 214 includes walls that extend from the inner back surface 211a and an opposite inner surface of the central sleeve 201, and end stops 214a at a bottom end. The first and second insert plate side edges (212c, 212d), and the stop tabs 213 on the central plate insert 212, fit between the walls of the single slots 214. When the central insert plate 212 is fully inserted into the central sleeve 201, the lip 210d of the front portion 210 leaves the bottom portion 212b exposed. Thus with the bottom portion 212b of the central plate insert 212 not covered by the lip 210d, the central plate insert 212 can be pulled downward or pushed upward and moved relative to the central sleeve 201. The end stops 214a prevent the central plate insert 212 from being able to completely slide out the central sleeve 201.

FIG. 4B illustrates the anti-blinding device 200 with the central plate insert 212 pulled down and the stop tabs 213 resting on the end stops 214a. From this position the triangular-shaped filters 205 can be moved into downward and outward positions. In addition, with the central plate insert 212 fully inserted within the central sleeve 201, the triangular-shaped filters 205 may still be rotated downward using first tabs 206.

FIGS. 5A-5E illustrate an anti-blinding device 300 including a central sleeve 301, a central plate insert 312, and a plurality of light filter panels (315, 316, 317) with varying degrees of transparency. The anti-blinding device 300 includes triangular-shaped filters 305 that are attached by fasteners 308 to corners 312a of the central plate insert 312. The central sleeve 301 includes a back portion 311 and a front portion 310. The front portion 310 includes first and second side edges (310a, 310b), a middle section 310c, and defines a lip 310d that allows a bottom portion 312b of the central plate insert 312 to remain accessible in order to pull down the central plate insert 312. A track set 325 is provided between the first side edge 310a and a back surface 311a of the back portion 311. Another track set 325 is disposed between the second side edge 310b and the back surface 311a.

Figure 5A:
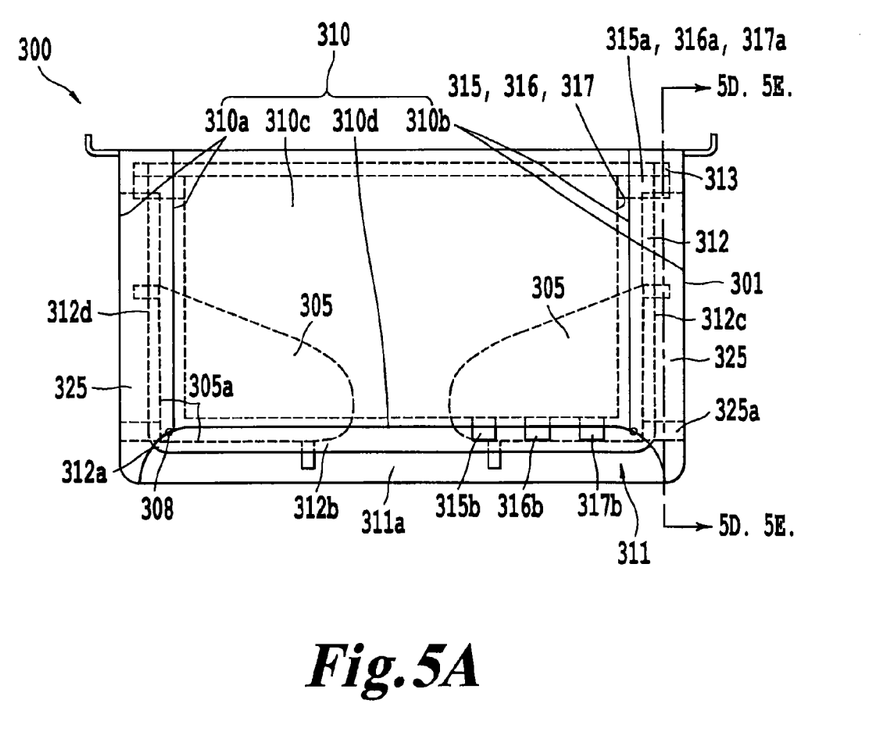
FIGS. 5A-5C illustrate an anti-blinding device inside of a central sleeve.

Each light filter panel (315, 316, 317) includes a panel pull down tab (315b, 516b, 317b). The pull down tabs (315b, 316b, 317b) may be used by a driver in the same manner as the bottom portion 312b of the central plate insert 312 to pull down respective light filter panels (315, 316, 317). The driver may pull down a different combination of light filter panels (315, 316, 317) to achieve a desired level of filtering. Any of the light filter panels (315, 316, 317) or the central insert plate 312 can be pulled down independently.

Figure 5B:
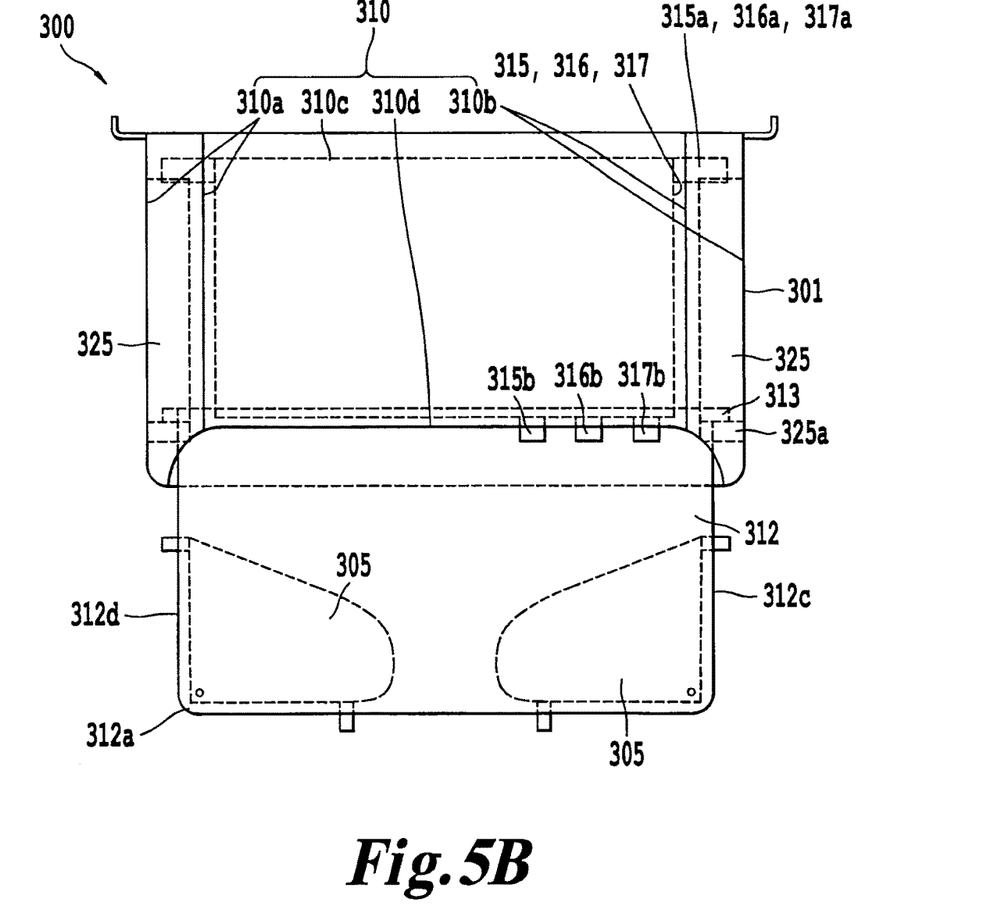
Figure 5C:
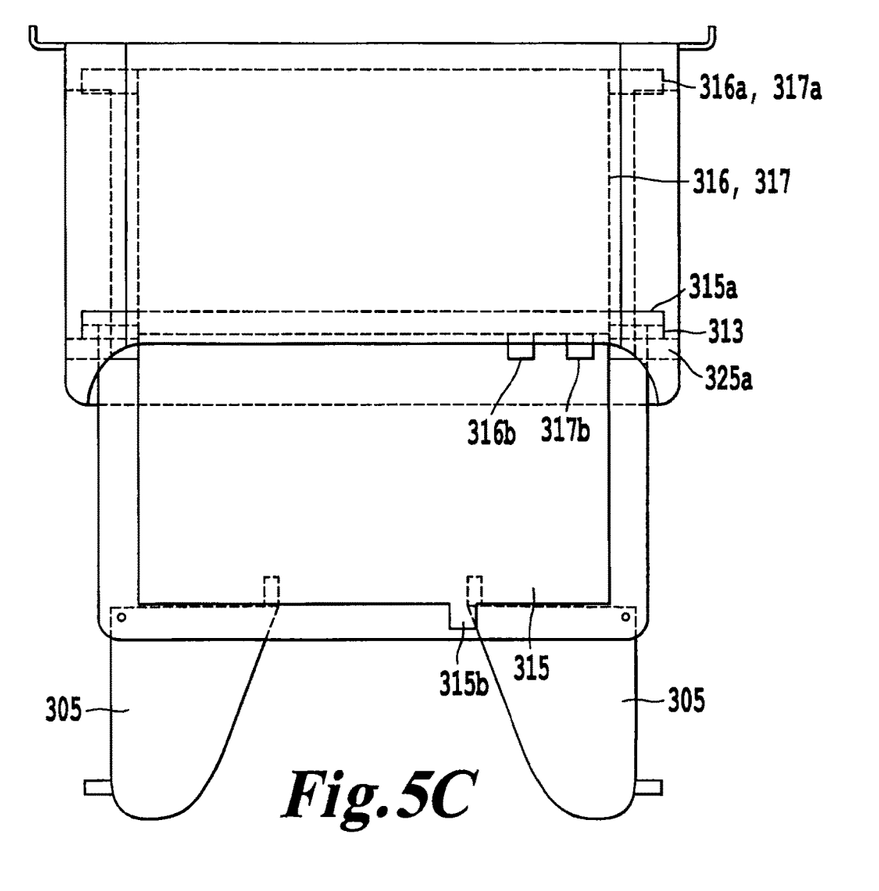

FIGS. 5B and 5C illustrate the anti-blinding device 300 in a state in which the central insert plate 312 has been pulled down. In FIG. 5C the light filter panel 315 has been pulled down. The lip 310d of the front section 310 of the central sleeve 301 is shaped so the panel pull down tabs (315b, 316b, 317b) remain accessible even when the light filter panels (315, 316, 317) are completely inserted within the central sleeve 301.

Figure 5D:
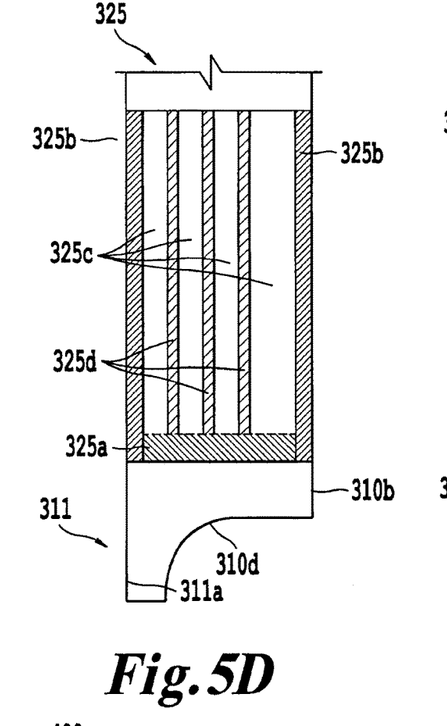
FIGS. 5D and 5E illustrate opposite cross-section views along line 5D.5E-5D.5E in FIG. 5A.
Figure 5E:
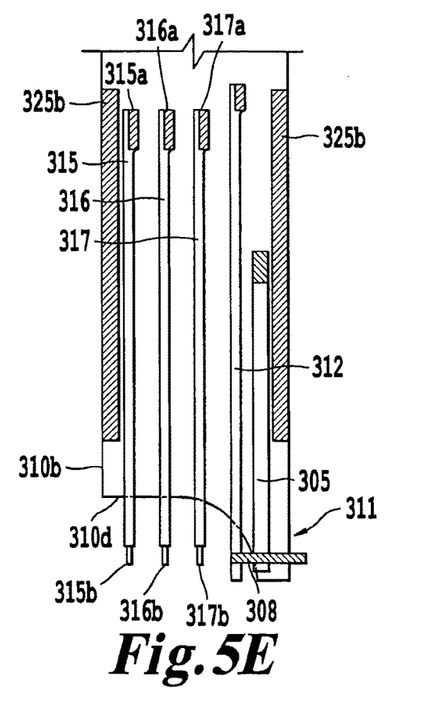

FIGS. 5D and 5E illustrate opposite cross-section views along line 5D.5E-5D.5E in FIG. 5A, which include cross-section views of one track set 325 of the anti-blinding device 300 that are exemplary of both track sets 325. Each of the track sets 325 include pairs of outer ribs 325b that contact the front portion 310 and the back portion 311 of the central sleeve 301. In each track set 325, a plurality of tracks 325c are defined by the outer ribs 325b and internal ribs 325d. In a lower section of each track set 325, an end stop 325a extends across the tracks 325c.

The track sets 325 define corresponding pairs of tracks 325c. Each pair of corresponding tracks 325c defined by the track sets 325 accommodate the stop tabs 313 on opposite sides of the central plate insert 312, or one set of panel stop tabs (315a, 316a, 317a) on opposite sides of one of the light filter panels (315, 316, 317). A first insert plate side edge 312c, and a second insert plate side edge 312d overlap with outer ribs 325b of respective track sets 325, and may slide within the respective pair of corresponding tracks 325c in which the stop tabs 313 slide. This arrangement provides guided motion of the central plate insert 312 and the light filter panels (315, 316, 317) within, and relative to, the central sleeve 301. In addition, if one of the light filter panels (315, 316, 317) or the central insert plate 312 is moved downward so that the end stops 325a come into contact with the stop tabs 313 or light filter stop tabs (315a, 316a, 317a), the end stops 325a will prevent further downward movement of light filter panels (315, 316, 317) or the central plate insert 312.

In addition to the arrangements illustrated in FIGS. 4A-4B and FIGS. 5A-5E, an anti-blinding device provided with a central plate insert disposed within a central sleeve, can be provided as a unit which can be attached to a visor of an automobile, and removed if so desired. In such an arrangement, the central sleeve can be attached to the side of a visor that faces a driver when deployed. The central sleeve can be attached by way of clips, clamps, Velcro, or other known attachment mechanisms.

Figure 6A:
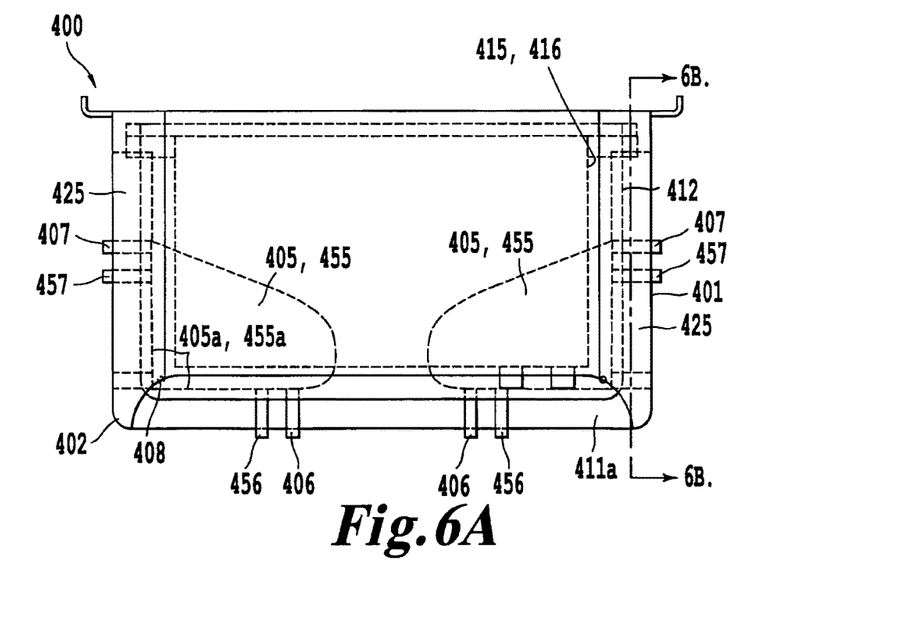
FIG. 6A illustrates an anti-blinding device inside of a central sleeve.
Figure 6B:
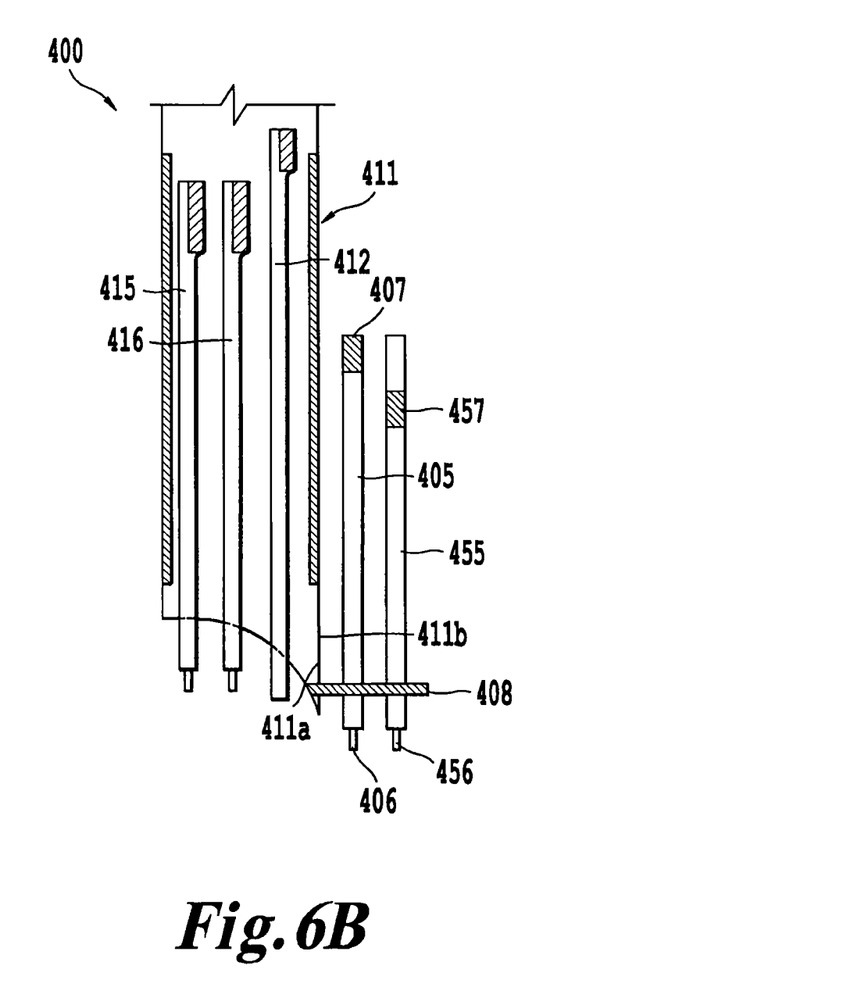
FIG. 6B illustrates a cross-section view along line 6B-6B in FIG. 6A.

FIGS. 6A and 6B illustrate an anti-blinding device 400 including a central sleeve 401, a central plate insert 412, light filter panels (415, 416), track sets 425, and at least one pair of a first triangular-shaped filter 405 and a second triangular-shaped filter 455. The first and second triangular-shaped filters (405, 455) are not attached to a central plate insert 412 disposed within the central sleeve 401. In either one or both corners 402 of the central sleeve 401, a fastener 408 rotatably attaches the first triangular-shaped filter 405 and the second triangular shaped filter 455 to a back portion 411 of the central sleeve 401. As illustrated in FIG. 6B, the fastener 408 extends through an inner surface 411a and a back surface 411b of the back portion 411, to attach the first triangular-shaped filter 405 and the second triangular-shaped filter 455 to the central sleeve 401. The first triangular-shaped filter 405 is arranged adjacent to the second triangular-shaped filter 455 on the fastener. As illustrated, each fastener attaches at least two triangular-shaped filters to the central sleeve. However more than two triangular-shaped filters can be provided with a single fastener.

First and second tabs (406, 407) are provided on each first triangular shaped filter 405. With each first triangular-shaped filter 405, straight edges 405a connect at a right angle, and the first and second tabs (406, 407) extend from ends of the straight edges 405a. First and second tabs (456, 457) are provided on each second triangular shaped filter 455. With each second triangular-shaped filter 455, straight edges 455a connect at a right angle, and the first and second tabs (456, 457) extend from middle portions of the straight edges 455a. This provides the advantage of having track sets 425 with a reduced width, and provides for a smaller central sleeve 401. In addition, a driver can change the amount of light filtered by triangular-shaped filters by using one or both of the first and second triangular-shaped filters (405, 455).

In addition to the arrangement illustrated in FIGS. 6A-6B, sets of two more adjacently arranged triangular-shaped filters can be also be fastened to corners of a central plate.

Figure 7A:
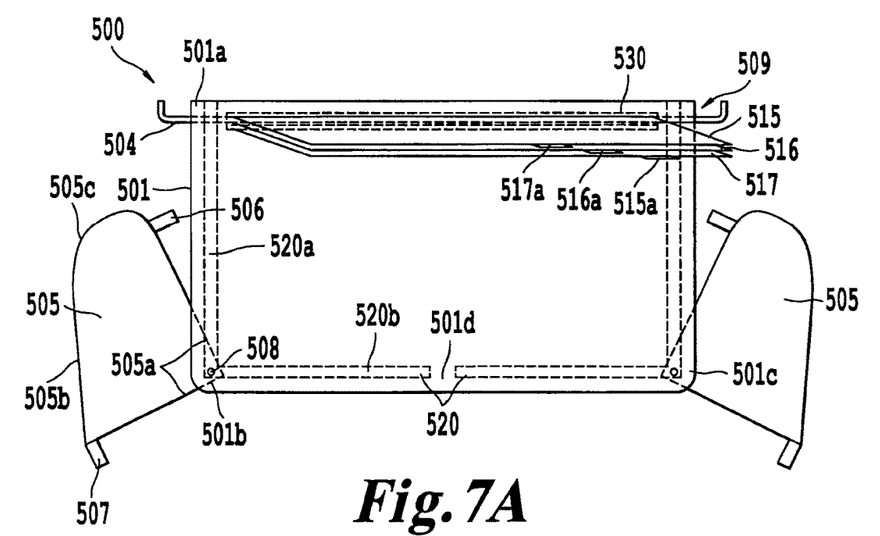
FIGS. 7A-7C illustrate an anti-blinding device including attached panels.
Figure 7B:
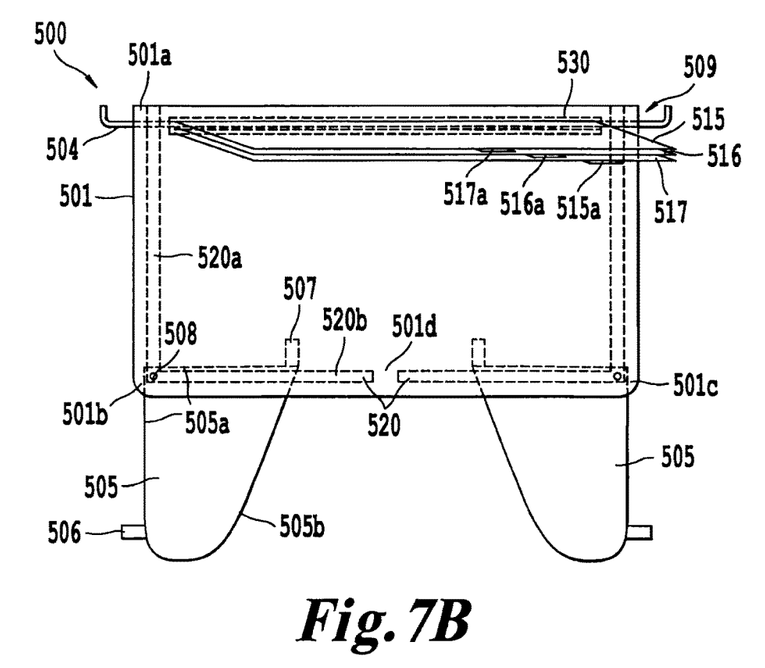
Figure 7C:
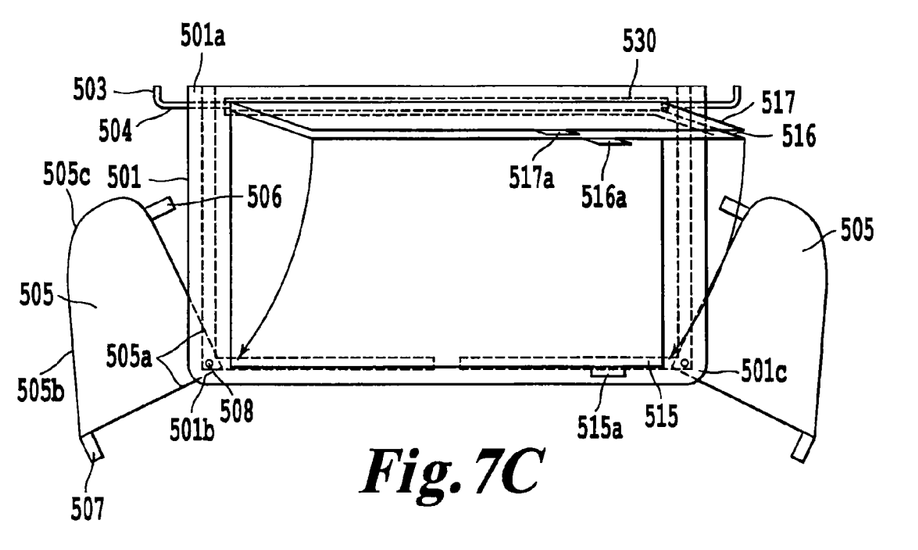

FIGS. 7A-7C illustrate an implementation of an anti-blinding device with panels attached. In FIGS. 7A-7C, a semi-transparent central plate 501 is deployed like the central plate 101 illustrated in FIG. 1A-1C. A top portion 509 of the semi-transparent central plate 501 includes a rectangular opening 530. A portion of a rod 504, which extends through the top portion 509 of the semi-transparent central plate 501, is exposed by the rectangular opening 530. The exposed portion of the rod 504 provides a hinged connection for a plurality of hinged light filter panels (515, 516, 517). The hinged light filter panels (515, 516, 517) are semi-transparent and may vary as to degree of transparency.

Each hinged light filter panel (515, 516, 517) includes a pull-down tab (515a, 516a, 517a) that may be used to deploy the hinged light filter panels (515, 516, 517) in succession, in order to increase the degree of filtering to be provided.

The anti-blinding device 500 includes triangular-shaped filters 505 attached to the semi-transparent central plate 501 by fasteners 508. Each triangular-shaped filter 505 includes two straight edges 505a connected at a right angle to each other, a third straight edge 505b, and a curved edge 505c extending from the third straight edge 505b. A first tab 506 extends at a right angle from an end of one of the two straight edges 505a connected to the curved edge 505b. A second tab 507 extends from an end of the other straight edge 505a that is connected to the third straight edge 505b.

The fasteners 508 attach the triangular-shaped filters 505 to the central plate 501, on a side of the central plate 501 that does not face a driver when the central plate 501 is rotated downward. The fasteners 508 slide within plate tracks 520, which are provided on the same side of the central plate 501 to which the triangular-shaped filters 505 are attached. The plate tracks 520 allow four way directional movement of the fasteners 508 and triangular-shaped filter 505. The triangular-shaped filters 505 can move up and down within the first section 520a, and laterally within the second section 520b of the plate tracks 520. The plate track 520 on the left hand side of the central plate 501, for example, includes a first section 520a that extends vertically from a first corner 501a to a second corner 501b of the central plate 501. In addition, a second section 520b of the plate track 520 extends laterally from the second corner 501b towards a third corner 501c, and ends in a middle section 501d of the central plate 501.

The first and second tabs (506, 507) of each triangular-shape filter 505, are used to rotate triangular-shaped filters 505 to a desired angle, and slide the triangular-shaped filters 505 with the fasteners 508 in the first and second portions (520a, 520b) of the plate tracks 520. For example, when the triangular-shaped filters 505 are located in respective second or third corners (501a, 501b), the triangular-shaped filters 505 can be rotated to an angle so the first and second tabs (506, 507) are the only portions of the triangular-shaped filters 505 visible to a driver. In this position a respective first tab 506 can be used by a driver to move the triangular-shaped filters 505 laterally, and a respective second tab 507 can be used to move the triangular-shaped filters 505 up and down.

A number of implementations have been described. Nevertheless, it will be understood that various modifications may be made without departing from the spirit and scope of this disclosure. For example, advantageous results may be achieved if the steps of the disclosed techniques were performed in a different sequence, if components in the disclosed systems were combined in a different manner, or if the components were replaced or supplemented by other components.

The invention claimed is:

1. A light filter assembly comprising:
a central plate including a first fastener attached to the central plate;
a first filter attached to the central plate by the first fastener, the first filter including a substantially triangular shape including a curved edge, and the first filter being rotatable about the first fastener in a plane parallel to the central plate; and
a sleeve including a back portion and a front portion, the front portion includes a middle section, and the central plate is disposed between the front portion and the back portion of the sleeve, wherein the back portion defines a top edge and a bottom edge of the sleeve, the front portion includes a first side section and a second side section that extend from the top edge to the bottom edge of the sleeve in a vertical direction of the sleeve, the middle section extends from the first side section to the second side section in a horizontal direction and defines a lip, the middle section does not extend to the bottom edge such that the lip provides a portion of an inner surface of the back portion that is not covered by the front portion of the sleeve, and with the central plate completely inserted in the sleeve, a lower portion of the central plate extends below the lip.

2. The assembly according to claim 1, wherein:
the first filter includes a first straight edge, a second straight edge, and a third straight edge,
a first end of the first straight edge is connected to a first end of the third straight edge,
a first end of the second straight edge is connected to a first end of the curved edge,
a second end of the curved edge is connected to a second end of the third straight edge, and
a second end of the first straight edge is connected to a second end of the second straight edge.

3. The assembly according to claim 2, further comprising:
a track formed on a surface of the central plate and extending from a first corner of the central plate to a second corner of the central plate along a first edge of the central plate, wherein
the first fastener is provided in the track and the first fastener and the first filter slide along the first edge when the first fastener slides in the track between the first corner and the second corner.

4. The assembly according to claim 3, wherein:
the track extends along a second edge of the central plate towards a middle portion of the central plate from one of the first corner and the second corner;
the second edge is perpendicular to the first edge of the central plate; and
the first fastener and the first filter slide along the second edge when the first fastener slides in the track between the middle portion and one of the first corner and second corner.

5. The assembly according to claim 4, further comprising:
a second filter attached to the central plate by a second fastener; and
a second track formed on the surface of the central plate, wherein
the second track extends from a third corner toward the middle section along the second edge, and the second track extends from the third corner to a fourth corner of the central plate along a third edge of the central plate, and
the second fastener is provided in the second track and the second fastener and the second filter slide along one of the second edge and the third edge when the second fastener slides in the second track.

6. The assembly according to claim 2, further comprising:
a second filter attached to the central plate by a second fastener, wherein the first filter and the second filter are attached to a back side of the central plate.

7. The assembly according to claim 6, wherein:
the second filter includes a first straight edge, a second straight edge, and a third straight edge, a first end of the first straight edge is connected to a first end of the third straight edge, a first end of the second straight edge is connected to a first end of the curved edge, a second end of the curved edge is connected to a second end of the third straight edge, and a second end of the first straight edge is connected to a second end of the second straight edge.

8. The assembly according to 7, wherein:

each of the first filter and second filter include a first protrusion extending from a respective first end of a respective first straight edge, and a second protrusion extending from a respective first end of a respective second straight edge.

9. The assembly according to claim 6, wherein the first filter, the second filter, the back portion, and the front portion of the sleeve are semi-transparent.

10. The assembly according to claim 1, wherein:

the sleeve comprises:

a first track between the back portion and the first side section that receives a first side edge and a first stop tab of the central plate; and a second track between the back portion and the second side section that receives a second side edge and a second stop tab of the central plate, and the central plate slides within first track and the second track in the vertical direction.

11. The assembly according to claim 1, further comprising:

a plurality of light filters positioned in the sleeve between the front portion and the back portion, wherein each of the light filters is provided with a protrusion and is movable in the vertical direction relative to the sleeve, and the central plate is disposed between the plurality of light filters and the inner surface of the back portion of the sleeve.

12. The assembly according to claim 11, wherein the sleeve further comprises:

a first set of tracks provided between the back portion and the first side section, wherein each track in the first set of tracks receives one of a first stop tab of the central plate and a first stop tab of one of the plurality of light filters respectively; and a second set of tracks provided between the back portion and the second side section, wherein each track in the second set of tracks receives one of a second stop tab of the central plate and a second stop stab of one of the plurality of light filters respectively, wherein the central plate and each of the plurality of light filters slide in the vertical direction relative to the sleeve.

13. A light filter assembly comprising:

a central plate and a central sleeve;

a first fastener attached to one of the central plate and the central sleeve;

a first filter attached to the one of the central plate and the central sleeve by the first fastener, the first filter including a substantially triangular shape including a curved edge, and the first filter being rotatable about the first fastener in a plane parallel to the one of the central plate and the central sleeve; and a second filter attached to the one of the central plate and the central sleeve by the first fastener, the second filter being arranged adjacent to the first filter on the first fastener, the second filter including a substantially triangular shape including a curved edge, and the second filter being rotatable about the first fastener in a plane parallel to the one of the central plate and the central sleeve, wherein the central sleeve includes a back portion and a front portion, and the front portion includes a middle section, the back portion defines a top edge and a bottom edge of the central sleeve, the front portion includes a first side section and a second side section that extend from the top edge to the bottom edge of the central sleeve in a vertical direction of the central sleeve, the middle section extends from the first side section to the second side section in a horizontal direction and defines a lip, and the middle section does not extend to the bottom edge such that the lip provides a portion of an inner surface of the back portion that is not covered by the front portion of the central sleeve.

14. The light filter assembly of claim 13, further comprising:

a second fastener attached to the one of the central plate and the central sleeve;

a third filter attached to the one of the central plate and the central sleeve by the second fastener, the third filter including a substantially triangular shape including a curved edge, and the third filter being rotatable about the second fastener in a plane parallel to the one of the central plate and the central sleeve; and a fourth filter attached to the one of the central plate and the central sleeve by the second fastener, the fourth filter being arranged adjacent to the third filter on the second fastener, the fourth filter including a substantially triangular shape including a curved edge, and the fourth filter being rotatable about the second fastener in a plane parallel to one of the central plate and the central sleeve.

* * * * *